(12) United States Patent
Hironori et al.

(10) Patent No.: US 8,500,025 B2
(45) Date of Patent: Aug. 6, 2013

(54) COMPACT BAR CODE SCANNER ASSEMBLY

(75) Inventors: Kawamoto Hironori, Saitama Pref. (JP); Toyama Toshiyuki, Saitama Pref. (JP); Masayoshi Yamanouchi, Saitama Pref. (JP)

(73) Assignee: Optoelectronics Co., Ltd. (JP)

( * ) Notice: Subject to any disclaimer, the term of this patent is extended or adjusted under 35 U.S.C. 154(b) by 634 days.

(21) Appl. No.: 12/513,274

(22) PCT Filed: Nov. 9, 2006

(86) PCT No.: PCT/US2006/060712
§ 371 (c)(1), (2), (4) Date: Feb. 17, 2010

(87) PCT Pub. No.: WO2008/063189
PCT Pub. Date: May 29, 2008

(65) Prior Publication Data
US 2010/0133344 A1    Jun. 3, 2010

(51) Int. Cl.
*G06K 7/10*    (2006.01)
(52) U.S. Cl.
USPC ............... 235/462.43; 235/462.01; 235/454
(58) Field of Classification Search
USPC ..................... 235/454, 462.01, 486
See application file for complete search history.

(56) References Cited

U.S. PATENT DOCUMENTS

| | | | | |
|---|---|---|---|---|
| 4,864,348 A | * | 9/1989 | Fujiwara et al. | 396/542 |
| 5,367,151 A | | 11/1994 | Dvorkis et al. | |
| 5,479,201 A | * | 12/1995 | Sugiura et al. | 347/257 |
| 5,539,192 A | * | 7/1996 | Scofield et al. | 235/462.37 |
| 5,837,985 A | * | 11/1998 | Karpen | 235/462.27 |
| 5,984,188 A | * | 11/1999 | Dvorkis et al. | 235/472.01 |
| 6,175,406 B1 | * | 1/2001 | Iizuka et al. | 355/75 |
| 6,244,510 B1 | | 6/2001 | Ring et al. | |
| 6,287,021 B1 | | 9/2001 | Katoh et al. | |
| 6,340,114 B1 | * | 1/2002 | Correa et al. | 235/462.22 |
| 6,491,222 B1 | | 12/2002 | Dvorkis et al. | |
| 7,311,259 B2 | * | 12/2007 | Watanabe et al. | 235/462.14 |

FOREIGN PATENT DOCUMENTS

| | | |
|---|---|---|
| DE | 3318040 A1 | 8/1984 |
| DE | 69228891 T2 | 8/1999 |
| DE | 69524718 T2 | 9/2002 |
| EP | 0498366 A2 | 2/1992 |
| EP | 0715273 A2 | 6/1996 |

(Continued)

OTHER PUBLICATIONS

International Search Report and Written Opinion of PCT/US06/60712 (Nov. 9, 2006), dated Mar. 28, 2008.

(Continued)

*Primary Examiner* — Christle Marshall
(74) *Attorney, Agent, or Firm* — Kaplan Breyer Schwarz & Ottesen, LLP.

(57) ABSTRACT

A bar code scanner module is disclosed that may include a chassis housing an optical transmission system therein, the optical transmission system including a laser diode and a motor; a first circuit board coupled to the motor; and a second circuit board disposed within the chassis and in communication with the first circuit board. The module may further include a third circuit board disposed in proximity to the chassis and in communication with at least one of the first circuit board and the second circuit board.

12 Claims, 6 Drawing Sheets

FOREIGN PATENT DOCUMENTS

| JP | 6-236450 | 8/1994 |
| --- | --- | --- |
| JP | 2000-199869 A | 7/2000 |
| JP | 2000-306038 A | 11/2000 |
| JP | 2002304593 A | 10/2002 |

OTHER PUBLICATIONS

International Preliminary Report on Patentability, dated May 22, 2009, of PCT/US2006/60712, filed: Nov. 9, 2006.

Office Action in Japanese Application No. 2009-536211 (foreign counterpart), Jan. 16, 2012.

English translation of Office Action in Japanese Application No. 2009-536211 (foreign counterpart), Jan. 16, 2012.

Partial English translation of Japanese Application No. 2000-306038, Nov. 2, 2000.

"German Patent Application 11 2006004127.4-53 Office Action", Feb. 15, 2013, Published in: DE.

"German Patent Application 112006004127.4-53 Office Action", Oct. 5, 2010, Published in: DE.

* cited by examiner

COMPACT BAR CODE SCANNER ASSEMBLY

The present patent application is the U.S. national stage of International Application No. PCT/US06/060712, which was published in English on May 29, 2008 under Publication No. WO 2008/063189. The present application claims the benefit of the International Application, which is hereby incorporated by reference in its entirety.

BACKGROUND OF THE INVENTION

Bar code scanner systems are known. Printed circuit boards are among the components that are assembled to form bar code scanner systems and provide a variety of functions including motor control and decoding operations. Existing approaches generally involve assembling printed circuit boards to the exterior surfaces of a chassis that houses optical transmission and receiving equipment. Assembling the printed circuit boards to a chassis in this manner tends to substantially increase the size of the overall bar code scanner system or module. Moreover, providing a module having multiple external surfaces covered by printed circuit boards may make the module vulnerable to exposure to electrical noise and/or physical damage and may make the resulting module more difficult to incorporate within a larger structure. Accordingly, there is a need in the art to provide a bar code scanner module within a compact package that is sturdy and that is suitable for incorporation into a larger structure.

SUMMARY OF THE INVENTION

According to one aspect, the present invention is directed to a bar code scanner module, that may include: a chassis housing an optical transmission system therein, the optical transmission system including a laser diode and a motor; a first circuit board coupled to the motor; and a second circuit board disposed within the chassis and in communication with the first circuit board. The module may further include a third circuit board disposed in proximity to the chassis and in communication with at least one of the first circuit board and the second circuit board.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1A:
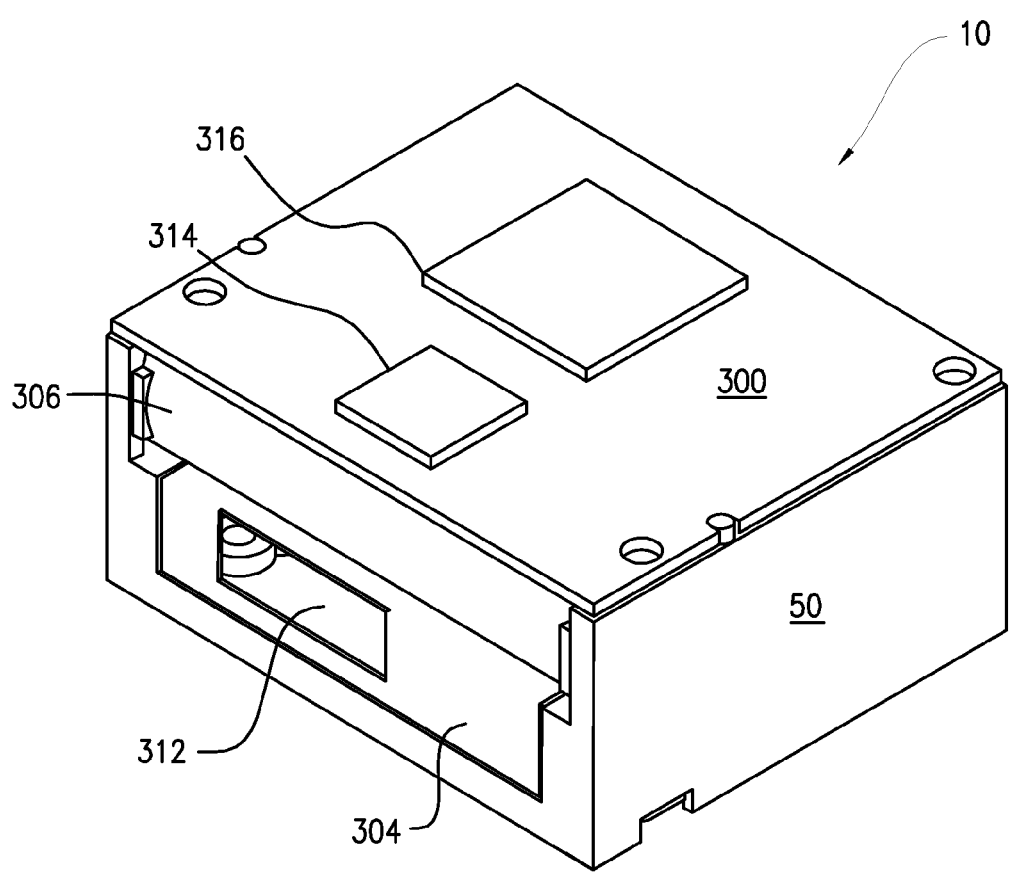
FIG. 1A is a perspective view of a bar code scanner module in accordance with one or more embodiments of the present invention.

In the following, a general introduction to module 10 is provided, followed by further description of the embodiments shown in the individual figures. With reference to FIGS. 1-5, in one or more embodiments, bar code scanner module 10 may include a chassis 50, a first circuit board 100, a second circuit board 200, and a third circuit board 300. In one or more embodiments, a "circuit board" may be a printed circuit board or other device for enabling interconnection of components within a sub-assembly of module 10.

In one or more embodiments, bar code scanner module 10 may include an optical transmission system 102 (FIG. 5), which may be disposed in proximity to circuit board 100 and/or an optical receiving system 302 (FIGS. 3-4), which may be disposed in proximity to circuit board 300 and/or chassis 50. More detail regarding the optical transmission system 102 and the optical receiving system will be provided later in this disclosure.

Bar code scanner module 10 may provide various space saving features that enable providing bar code scanning operation in a sturdy package occupying minimal space. More specifically, in one or more embodiments, space may be conserved by disposing one or more selected circuits on circuit board 200 which may be located in the interior of chassis 50, rather than being arranged along an external surface of chassis 50.

Herein, terms of geometric relations such as, bottom, top, side, and so forth, are used for the sake of convenience to describe the geometric relations of parts to one another as shown in one or more of the FIGS. However, it will be recognized that geometric positions and relationships between parts may change depending on the orientation of module 10. For example, circuit board 300, while shown at the top of module 10 in FIG. 1A, may form a side or top of module 10 upon suitably rotating or moving the module 10. Moreover, the relative positioning of parts with respect to each other may vary in one or more alternative embodiments of the present invention, and all such variations are intended to be included within the scope of the present invention.

FIG. 1A is a perspective view of a bar code scanner module 10 in accordance with one or more embodiments of the present invention. FIG. 1A shows chassis 50 having circuit board 300 on top (in the view of FIG. 1A). In one or more embodiments, circuit board 300 may have digital ASIC (Application Specific Integrated Circuit) 316 and analog ASIC 314 connected thereto. Shield 304, which may include light passage opening 312, may be connected to circuit board 300. Optical receiving lens 306 may be connected to circuit board 300 and/or chassis 50. As with the embodiment shown in FIG. 1A, shield 304 may extend over a substantial portion of one surface of module 10 and rest on a ledge forming part of chassis 50. In this manner, shield 304 may serve as a structural component of module 10 that helps hold circuit board 300 in place along an upper edge of chassis 50.

Figure 1B:
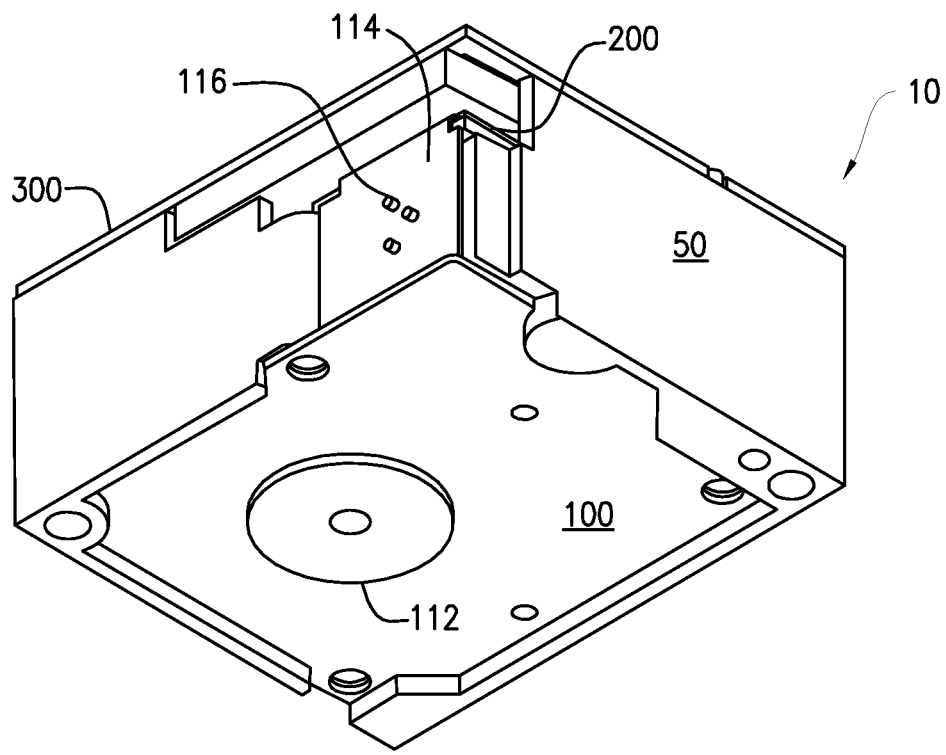
FIG. 1B is another perspective view of the bar code scanner module of FIG. 1A in accordance with one or more embodiments of the present invention.

FIG. 1B is another perspective view of the bar code scanner module 10 of FIG. 1A in accordance with one or more embodiments of the present invention. In one or more embodiments, motor 112 may be coupled to circuit board 100, which may be located at the bottom of module 10. In one or more embodiments, circuit board 100 may be formed of a flexible printed circuit board (FPC) material. In one or more embodiments, an extension of circuit board 100 may be in the form of FPC connector 114, which may connect circuit board 100 to circuit board 200. Laser diode terminal 116 may be located on an external surface of FPC connector 116 to enable provision of suitable external connections for laser diode 104 (see FIG. 2). In one or more alternative embodiments, circuit board 100 and/or connector 114 may be made of materials other than flexible printed circuit board material, and all such variations are intended to be included within the scope of the present invention.

Figure 2A:
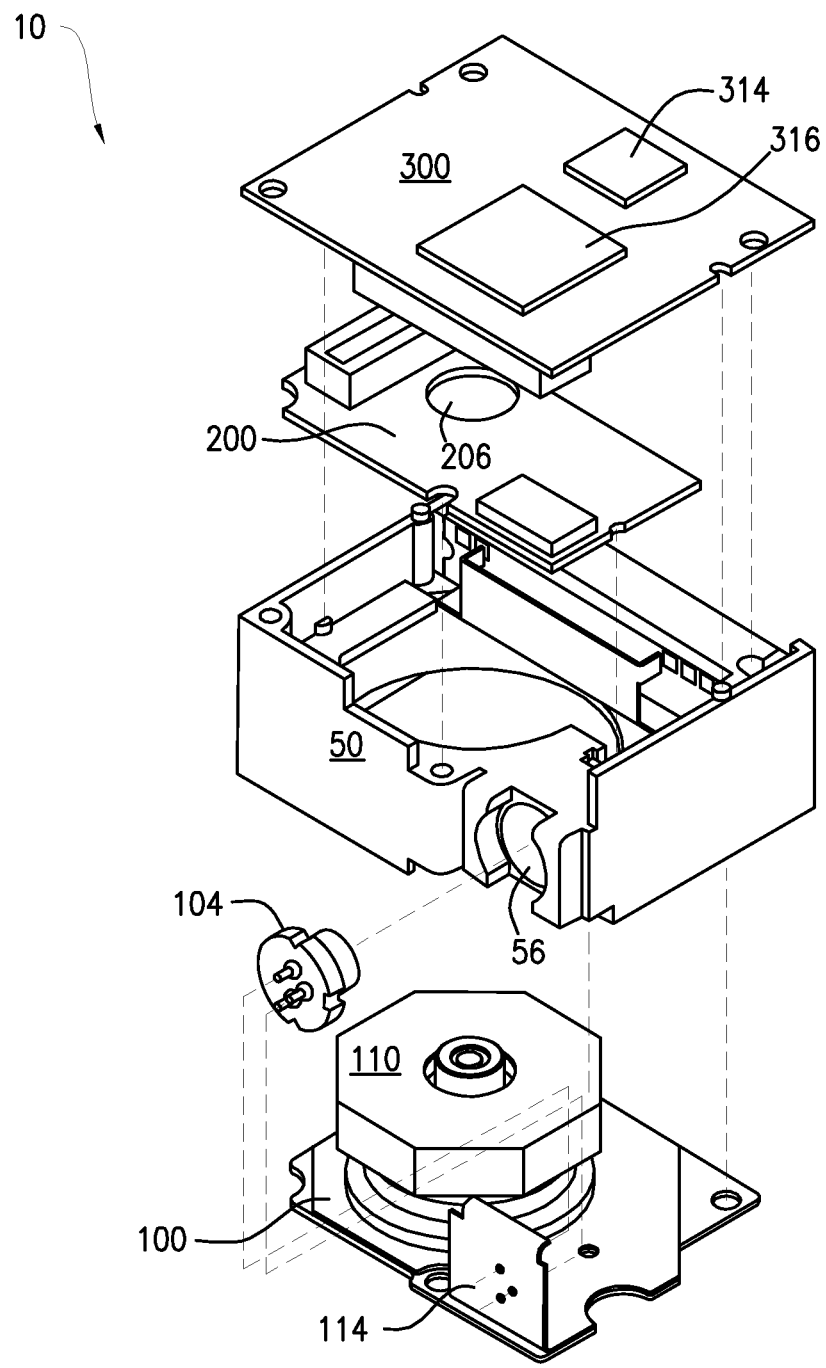
FIG. 2A is a blown up perspective view of the bar code scanner module of FIG. 1A in accordance with one or more embodiments of the present invention.

FIG. 2A is a blown up perspective view of bar code scanner module 10 in accordance with one or more embodiments of the present invention. To avoid repetition, a selection of parts previously discussed herein will not be discussed in connection with FIG. 2A. As shown in FIG. 2A, module 10 may include circuit board 300, circuit board 200, chassis 50, and circuit board 100. Greater detail regarding one or more of these portions of module 10 is provided in the following.

As shown in FIG. 2A, in one or more embodiments, circuit board 200 may have a hole 206 therethrough to accommodate a shaft extending from the center of motor 112 and through polygon mirror 110. Hole 206 may allow circuit board 200 to be located closer to circuit board 100 than would otherwise be possible, thereby aiding in reducing the size of module 10.

In one or more embodiments, chassis 50 may include an opening 56 for receiving laser diode 104. Moreover, chassis 50 may have a focusing lens 106 (FIG. 3) integrally formed therein.

In one or more embodiments, circuit board 100 may be made of FPC. Circuit board 100 may lead to FPC connector 114 which may connect circuit board 100 to circuit board 200. Circuit board 100 may be rigidly connected to a stationary side of motor 112 (see FIG. 1B). Motor 112 may be operable to rotate polygon mirror 110 which is shown extending upward from circuit board 100 in FIG. 2A.

Figure 2B:
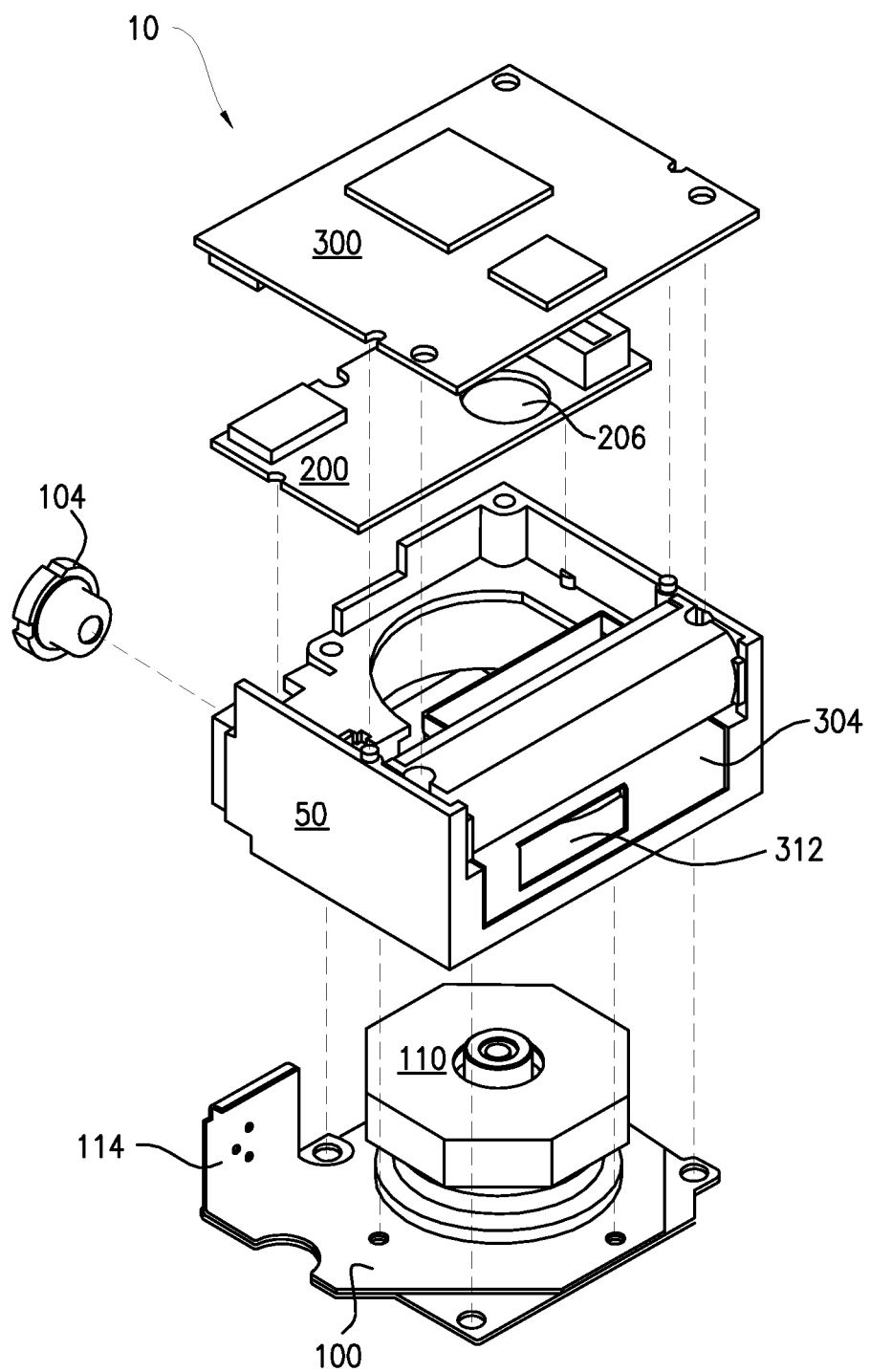
FIG. 2B is another blown up perspective view of the bar code scanner module of FIG. 1A in accordance with one or more embodiments of the present invention.

FIG. 2B is another blown up perspective view of the bar code scanner module 10 of FIG. 1A in accordance with one or more embodiments of the present invention. As with FIG. 2A, to avoid repetition, a selection of the parts previously discussed herein will not be discussed in connection with FIG. 2B. In the blown up view of the embodiment of FIG. 2B, shield 304 is shown already disposed on chassis 50, with circuit 300 shown separately. It will be appreciated that the component parts of module 10 may be assembled in any order, and the present invention is not limited to assembling optical receiving system 302 to chassis 50 first.

Figure 3:
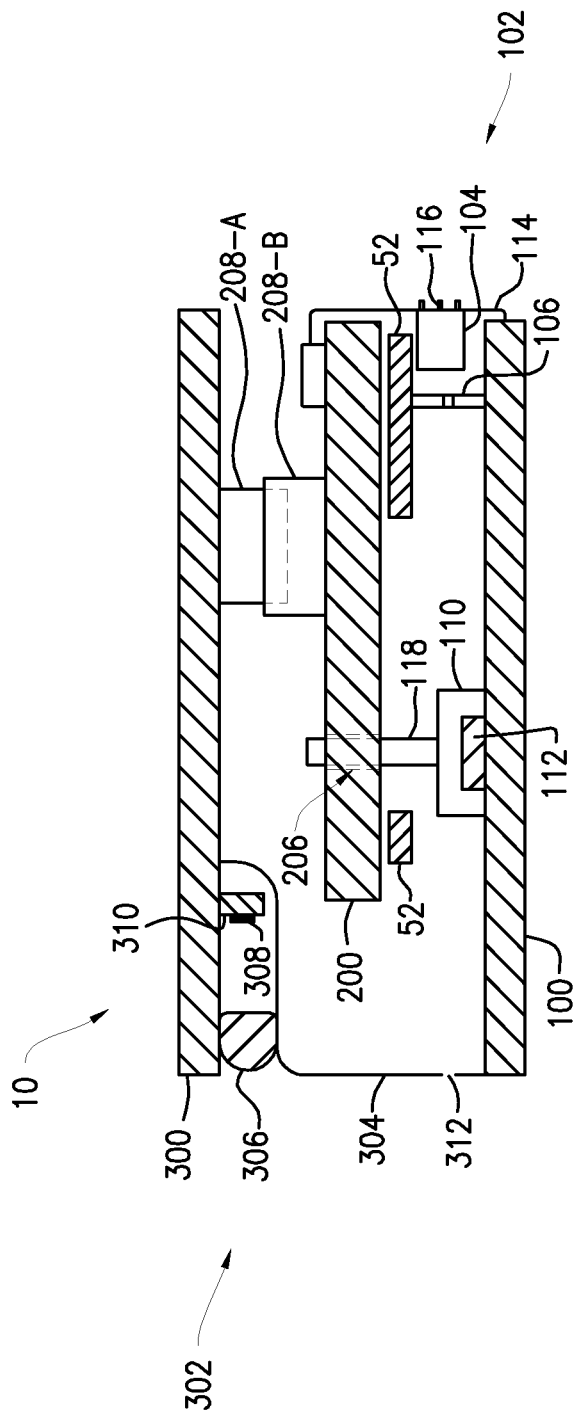
FIG. 3 is a partially sectional and partially elevational view of a portion of a bar code scanner module in accordance with one or more embodiments of the present invention.
Figure 4:
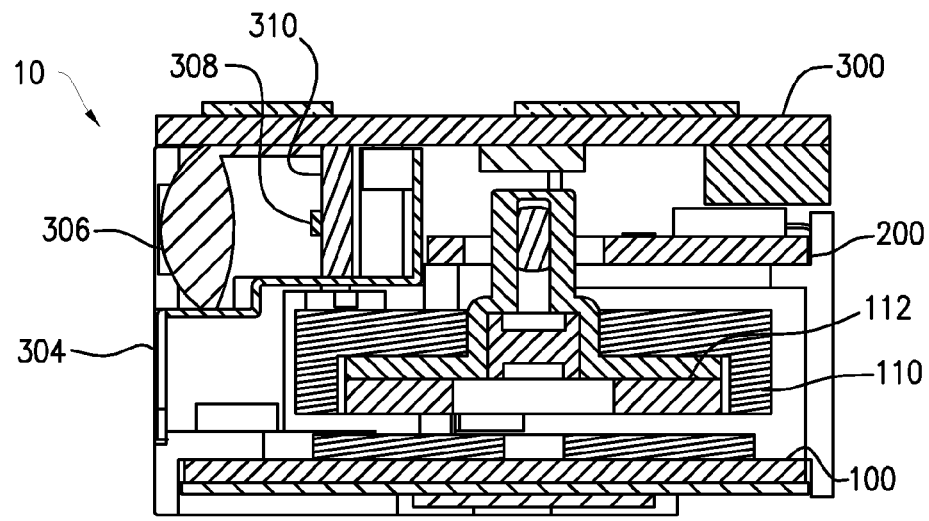
FIG. 4 is a sectional view of a bar code scanner module in accordance with one or more embodiments of the present invention.
Figure 5:
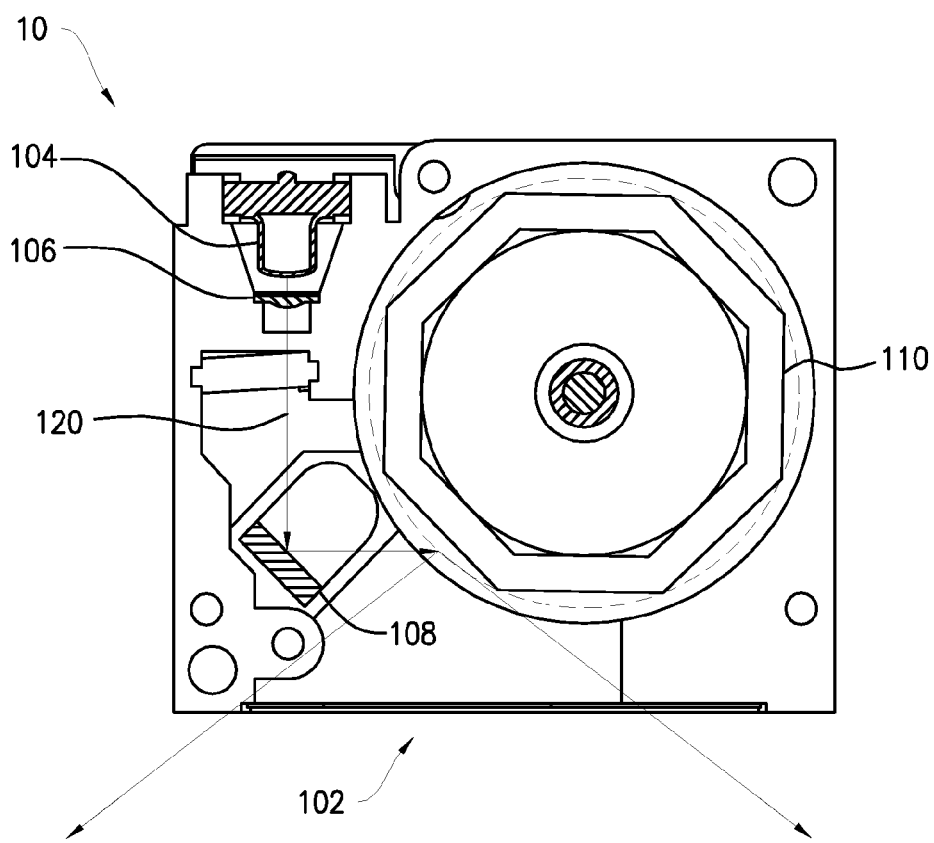
FIG. 5 is a sectional plan view of a bar code scanner in accordance with one or more embodiments of the present invention.

FIG. 3 is a partially sectional and partially elevational view of a portion of bar code scanner module 10 in accordance with one or more embodiments of the present invention. In FIG. 3, some components of module 10 have been omitted in order to emphasize various features of one or more embodiments of the present invention. Moreover, the positioning of one or more components with respect to other components has been presented so as to better illustrate various aspects of one or more embodiments of the present invention. Thus, the invention is not limited to the configuration shown in FIG. 3. Moreover, to emphasize one or aspects of the present invention, FIG. 3 is not drawn to scale. FIG. 4 is a sectional view of bar code scanner module 10 in accordance with one or more embodiments of the present invention. FIG. 5 is a sectional plan view of bar code scanner module 10 in accordance with one or more embodiments of the present invention. Reference is made to FIGS. 3-5 in the following.

In one or more embodiments, bar code scanner module 10 may include circuit boards 100, 200, and 300. Optical transmission system 102 may be disposed on, or in proximity to, circuit board 100. However, in one or more alternative embodiments, optical transmission system 102 may be located elsewhere within module 10. In one or more alternative embodiments, optical transmission system 102 may be located outside chassis 50.

In one or more embodiments, optical receiving system 302 may be coupled to circuit board 300 and/or chassis 50. However, in one or more alternative embodiments, optical receiving system 302 may be located elsewhere within module 10, or be located so as to be in communication with module 10. As with optical transmission system 102, in one or more alternative embodiments, optical receiving system 302 may be located outside chassis 50. Moreover, different components of optical receiving system 302 may be mounted to different respective surfaces within module 10.

In one or more embodiments, motor control circuitry may be disposed on circuit board 200, which circuit board may be sized so as to fit inside chassis 50. Thus, in one or more embodiments of the present invention, the distribution of components among circuit boards may include, among other component placements, placing optical transmission system 102 near the bottom of chassis 50, in proximity to circuit board 100, optical receiving system 302 in proximity to circuit board 300, and motor control circuitry on, or in proximity to, circuit board 200. Moreover, in one or more embodiments, circuit boards 100, 200, and 300 may be parallel to one another. In such embodiments, the placement of motor control circuitry and/or other operational components of module 10 on circuit board 200 may enable the overall size of module 10 to be reduced by enabling components that would otherwise be located on external surfaces of chassis 50 to be mounted on circuit board 200 and inside chassis 50.

While the following discussion is directed to embodiments having the above-described distribution of components among the circuit boards 100, 200, and 300, the present invention is not limited to the above-described configuration. In one or more alternative embodiments, the optical transmission system 102, optical receiving system 302, motor control circuitry, and/or other components of module 10 may be in locations other than those described above, within or outside of chassis 50, and all such variations are intended to be included within the scope of the present invention.

The following discussion is directed to various space-saving mechanisms that may be implemented in one or more embodiments of the present invention. As previously stated, the deployment of selected circuits on circuit board 200 that may otherwise be located on an exterior of chassis 50 may operate to reduce the size of module 10. Therefore, it is desirable that one or more embodiments of the present invention enable circuit board 200 to be located within chassis 50 without disturbing other components located in the interior of chassis 50.

In one or more embodiments, circuit board 200 may include at least one hole 206 (see FIGS. 2A and 2B) therethrough to accommodate shaft 118 extending from motor 112 and polygon mirror 110. Providing hole 206, as shown in FIG. 3, may enable circuit board 200 to be placed closer to motor 112 than would otherwise be possible.

In one or more embodiments, at least one ledge 52, which may be integrally formed as part of chassis 50, may operate to support a surface, preferably the bottom surface, of circuit board 200. Support from ledge 52 may operate to secure circuit board 200 within chassis 50 and prevent mechanical interference between circuit board 200 and parts located proximate thereto in the interior of chassis 50. In one or more alternative embodiments, ledge 52 need not be integrally formed with chassis 50. Instead, ledge 52 could be separately manufactured and assembled to chassis 50 at a suitable stage in the manufacture of module 10.

In one or more embodiments, FPC connector 114 may be deployed to provide communication between circuit board 100 and circuit board 200. The use of flexible circuit board material may enable providing communication between circuit boards 100 and 200 in a manner that that does not take up space in the interior of chassis 50. Moreover, deploying an efficient connection between circuit boards 100 and 200 via connector 114 may enable the functionality of circuit boards 100 and 200 to be provided by two relatively small circuit boards (such as circuit boards 100 and 200 disclosed herein) that can be convenient located within chassis 50, rather than by a single large circuit board which would likely have to be located outside chassis 50, thereby undesirably increasing the size of module 10. In one or more alternative embodiments, connectors other than flexible circuit board connector 114 may be employed to enable communication between circuit board 100 and circuit board 200.

In one or more embodiments, a communication link may be provided between circuit board 200 and circuit board 300. In one or more embodiments, a board-to-board connector 208 may be employed having a first connector portion 208-a which is connected to circuit board 300 and a second connector portion 208-b which is connected to circuit board 200. Board-to-board connector 208 may provide a multiple-pin connection. Connector 208 may include a narrower rigid portion 208-a that is inserted into a wider rigid portion 208-b, with each such portion having multiple-pin connections. Board to board connector 208 may provide a compact and efficient mechanism for enabling communication between circuit boards 200 and 300 without requiring the use of connectors located at a rear portion of the boards (the portion of module 10 opposite the location of shield 304) and without requiring the use of wiring or cabling in the interior of chassis 50. However, in one or more alternative embodiments, one or more other types of data communication connections may be used to enable communication between circuit boards 200 and 300, and all such variations are intended to be included within the scope of the present invention.

In one or more embodiments, shield 304 may be coupled to chassis 50 and/or to circuit board 300. Shield 304 may at least partially surround one or more components of optical receiving system 302, such as, receiving lens 306, photodiode 308, and/or photodiode printed circuit board (PCB) 310. When deployed in this manner, shield 304 may operate to shield one or more components of optical receiving system 302 from transient light energy not pertinent to the optical data desired to be read by optical receiving system 302. Moreover, shield 304 may operate to prevent transient bursts of electrical energy, i.e. electrical noise, from reaching one or more components of optical receiving system 302. Shield 304 may be soldered or otherwise securely attached to circuit board 300 and/or chassis 50 in a manner enabling proper grounding shield 304. Shield 304 may be made of a suitably selected metal, or other suitable conductive material.

In one or more embodiments, shield 304 may include light passage opening 312 therein to provide an opening of desired dimensions for the transmission of light out of module 10 by optical transmission system 102.

In one or more embodiments, shield 304 may serve as a structural component of module 10. Shield 304 may occupy a significant portion of one external surface of module 10. As shown in FIGS. 1-3, shield 304 may occupy at least a portion of the module 10 surface that may be at least substantially perpendicular to the direction of light transmission from, and light reception by, module 10. In such embodiments, shield 304 may serve to at least partially enclose an interior of chassis 50 along the module 10 surface it extends across.

With reference to FIGS. 3 and 5, in one or more embodiments, optical transmission system 102 may include laser diode 104, focusing lens 106, bend mirror 108, motor 112, and polygon mirror 110. Optical transmission system 102 may enable light path 120 to emerge from laser diode 104, reflect off bend mirror 108, reflect off rotating polygon mirror 110, and exit module 10 through light passage opening 312 in shield 304 to generate a scan pattern.

In one or more embodiments, laser diode 104 may be configured to be press fit to chassis 50. In one or more alternative embodiments, laser diode 104 may be coupled to chassis 50, or to one or more other components of module 10, by other means.

In one or more embodiments, focusing lens 106 may be integrally formed as part of chassis 50. In such embodiments, focusing lens 106 may be constructed of the same material that the remainder of chassis 50 is constructed of, which may be a magnesium alloy, other metal, and/or other suitable material. In one or more alternative embodiments, focusing lens 106 may be manufactured as a separate component and be press fit to chassis 50. Herein, the term "focusing lens" and the term "collimator lens" are used interchangeably.

With respect to FIGS. 3 and 4, in one or more embodiments, optical receiving system may include shield 304, receiving lens 306, photodiode 308, and photodiode PCB 310. Shield 304 was discussed previously in this disclosure, and that discussion is therefore not repeated in this section. Receiving lens 306 may be a cylindrical lens. However, other lens configurations may be employed for receiving lens 306. Photodiode 308 may be a conventional photodiode as is known in the art. Photodiode 308 may be suitably positioned in a fixed location with respect to receiving lens 306 so as to receive light after passing through receiving lens 306. Photodiode PCB 310 may be connected to photodiode 308 and receive a signal therefrom. Moreover, photodiode PCB 310 may be connected to circuit board 300. The connection of photodiode PCB 310 to circuit board 300 may be implemented using soldering. However, other suitable attachment mechanisms may be practiced for coupling photodiode PCB 310 to circuit board 100.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A bar code scanner module, comprising:
a chassis housing an optical transmission system therein, the optical transmission system including a laser diode and a motor;
a first circuit board coupled to the motor; and
a second circuit board disposed within the chassis and in communication with the first circuit board;
wherein at least a portion of the first circuit board is made of flexible printed circuit (FPC) board.

2. A bar code scanner module, comprising:
a chassis housing an optical transmission system therein, the optical transmission system including a laser diode and a motor;
a first circuit board coupled to the motor; and
a second circuit board disposed within the chassis and in communication with the first circuit board;
wherein the second circuit board comprises motor control circuitry.

3. A bar code scanner module, comprising:
a chassis housing an optical transmission system therein, the optical transmission system including a laser diode and a motor;
a first circuit board coupled to the motor; and
a second circuit board disposed within the chassis and in communication with the first circuit board;
wherein the second circuit board is coupled to the first circuit board along an flexible printed circuit board (FPC) connector.

4. The module of claim 3 wherein the first circuit board is a flexible printed circuit board and wherein the FPC connector is an extension of the first circuit board.

5. The module of claim 3 further comprising a terminal connection, for the laser diode, disposed on the FPC connector.

6. A bar code scanner module, comprising:
a chassis housing an optical transmission system therein, the optical transmission system including a laser diode and a motor;
a first circuit board coupled to the motor; and
a second circuit board disposed within the chassis and in communication with the first circuit board;
wherein the second circuit board includes a hole accommodating a shaft extending along an axis of rotation of the motor.

7. A bar code scanner module, comprising:
a chassis housing an optical transmission system therein, the optical transmission system including a laser diode and a motor;
a first circuit board coupled to the motor; and
a second circuit board disposed within the chassis and in communication with the first circuit board;
a third circuit board disposed in proximity to the chassis and in communication with at least one of the first circuit board and the second circuit board, the third circuit board being connected to the second circuit board via a board-to-board connector;
an optical receiving system disposed within the chassis, comprising:
a receiving lens;
a photodiode positioned so as to receive light from the receiving lens; and
a photodiode PCB (printed circuit board) configured to receive a signal from the photodiode; and
a shield operable to protect the optical receiving system from electrical noise.

8. The module of claim 7 wherein the shield at least partially surrounds the receiving lens and the photodiode.

9. The module of claim 7 wherein a portion of the shield extends across a surface of the chassis that is substantially perpendicular to a direction of light transmission from the optical transmission system.

10. The module of claim 9 wherein the portion of the shield extending across the surface of the chassis includes an opening for the light transmission.

11. The module of claim 9 wherein the shield portion extending across the surface of the chassis is operable to at least partially enclose an interior of the chassis along the substantially perpendicular surface.

12. A bar code scanner module, comprising:
a chassis housing an optical transmission system therein, the optical transmission system including a laser diode and a motor;
a first circuit board coupled to the motor; and
a second circuit board disposed within the chassis and in communication with the first circuit board;
a third circuit board disposed in proximity to the chassis and in communication with at least one of the first circuit board and the second circuit board, the third circuit board being connected to the second circuit board via a board-to-board connector;
wherein circuit mounting surfaces of the first, second, and third circuit boards are arranged at least substantially parallel to one another.

* * * * *